JAMES E. EMERSON.
Improvement in Saws for Sawing Stone.
No. 113.993        Patented April 25, 1871.
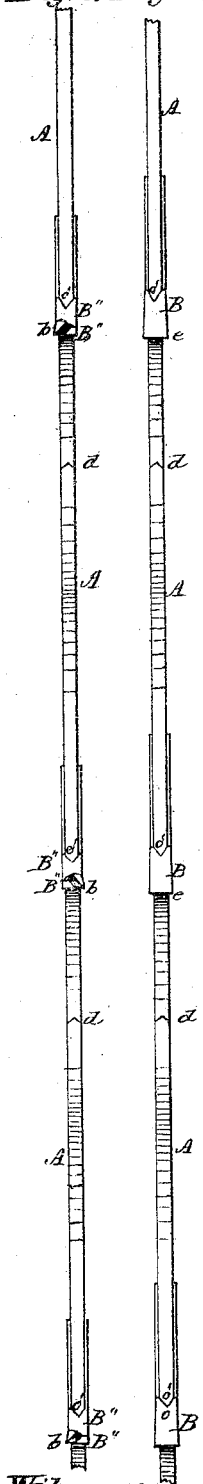
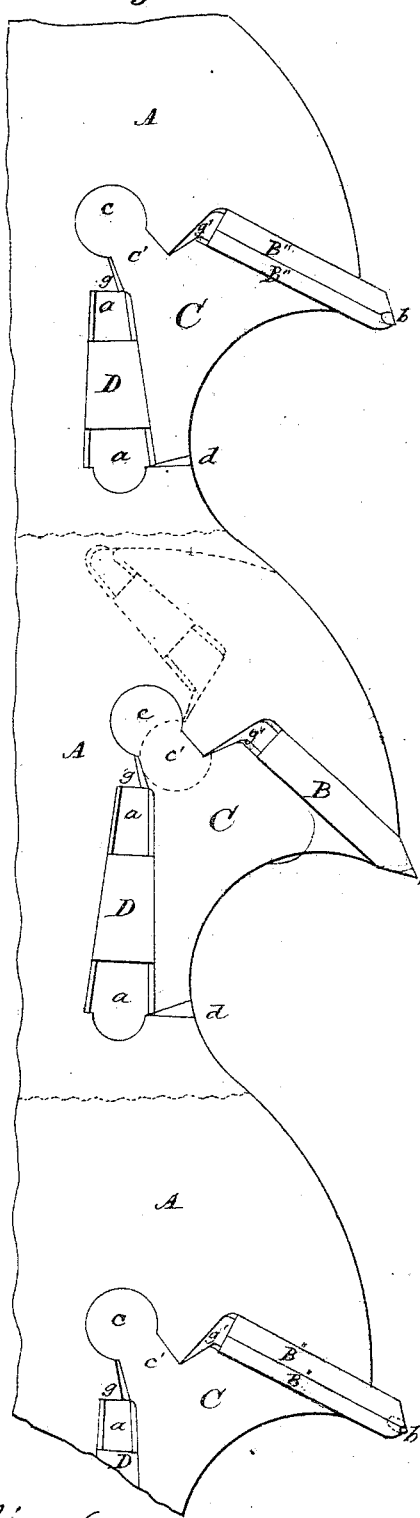
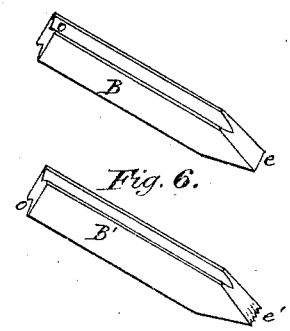
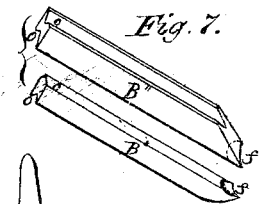
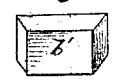
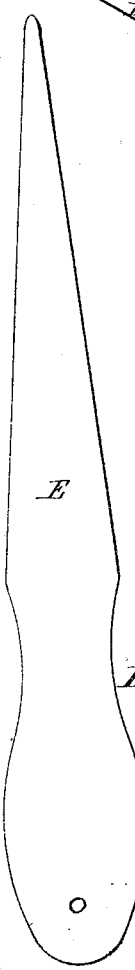
Witnesses:
Charles Chinn
Charles Wilson
Inventor:
James E. Emerson
By N. Crawford
Atty

UNITED STATES PATENT OFFICE.

JAMES E. EMERSON, OF TRENTON, NEW JERSEY.

IMPROVEMENT IN SAWS FOR SAWING STONE.

Specification forming part of Letters Patent No. 113,993, dated April 25, 1871.

*To all whom it may concern:*

Be it known that I, JAMES E. EMERSON, of Trenton, in the county of Mercer, in the State of New Jersey, have made certain Improvements in Saws for Sawing Stone, of which the following is a specification.

The object of this invention is to overcome difficulties that have heretofore existed, so that hard stone can be as successfully sawed with a circular saw as is wood or other fibrous material; and it consists in the construction of the adjustable and reversible chisels or cutters, the manner of holding them in the saw-plate, the construction of a holder or jaws for holding diamonds, carbons, or other mineral points, the adaptability of these devices for use in a circular saw, and a saw as constructed with these devices for sawing stone.

In the drawing, Figure 1 shows a section of a circular saw for sawing stone, having different kinds of cutters, that are adjusted as to their projection, and a cutter that is reversible, and the devices for holding and clamping them in the saw-plate. Fig. 2 is an edge view of the same. Fig. 3 is an edge view of a section of a saw with diamond cutters or points. Fig. 4 is an edge view of a section of a saw having all the cutters with chisel cutting-edges. Fig. 5 is a perspective of a reversible cutter with chisel-edge. Fig. 6 is a perspective of the same cutter with serrated edge. Fig. 7 is a perspective of the diamond or other mineral point holder detached from the saw-plate. Figs. 8, 9, and 10 are perspective views of the shapes of the diamonds or carbons that are used as cutting-points. Fig. 11 is a side view of a lever-wrench, and Fig. 12 is a view of the channel or kerf cut by the saw when constructed as seen in Fig. 2.

A represents a saw-plate or sections of a saw-plate, constructed to receive the tooth and tooth-clamp.

B represents a cutter, having a chisel-edge, $e$, that is in the center of the projecting part of the cutter, as seen in Figs. 1, 2, 4, and 5.

B' is the same cutter in form of body, but instead of a straight cutting-edge, as at $e$, it has a serrated edge, $e'$, as seen in Fig. 6.

These cutters B and B' are made a little thicker than the saw-plate—thicker on the forward than rear edge, and thicker or wider on the cutting-edge $e$ or $e'$ than at any other part of their length; are made parallel on their edges, with V-shaped grooves $o$ in both edges, or the groove may be circular if desired; and are interchangeable with each other, as the teeth are made in quantities, all alike, and any one of the number will fit in any of the spaces or recesses in the saw-plate that receives a cutter.

B'' B'' are jaws for holding diamonds or other points for cutting the stone, and are made as seen in Fig. 7, one part fitting in the other, with such a cavity between them at their outer ends as will fit the shape of diamond or other point $b$, as seen at $f\,f$, Fig. 7, and when thus put together, with such point between them, will just fill and occupy the space that the cutter B does, and are interchangeable therewith when necessary.

C is a clamp or cutter-holder, made in the form as seen in Fig. 1, having neck $c'$ and pivotal or joint piece $c$, and is punched out of the saw-plate A by means of a punch of the exact shape, fitting a proper die, when the plate is still further prepared and cut to receive the cutter between the clamp and plate, and have a tapering space or opening, $a$, between the clamp and saw-plate. The recess thus formed in the saw-plate will have a sharp angular ridge or round projection, $o'$, wrought on the edge where the cutter B bears and on the edge of the plate that forms one side of the tapering opening $a$, and there will be on the edges of the clamp C, next the cutter, and the opening or space $a$, a like angular or round projection.

Where the neck $c'$ goes into the saw-plate the opening in the plate is cut out a little wider to allow the clamp to oscillate, as seen at $g$, Fig. 1.

The clamp-piece being cut or punched out of plate A before the plate is tempered or ground, and it and the plate finished in the form as above described, with the abutting joint between the clamp C and the plate A, at $d$, made with rib and groove to prevent lateral displacement of the parts, and the opening in the plate to receive the pivotal piece $c$ countersunk slightly on each side, when the clamp is placed in position and the pivoted piece $c$ slightly headed or riveted on each side of the plate into the countersinks, but not so as to prevent the clamp C from slightly turning on its pivot-point, when the saw can be tempered and finished with the clamp in place.

D is a wedge, having angular or round grooves in its inclined edges to fit on the ribs on the saw-plate and clamp, and is used for forcing the clamp C hard against the cutter B or holder B', as the case may be; and can be pushed or forced forward to tighten the clamp or cutter, or be forced back when the cutter or holder is to be released or adjusted, and so constructed with relation to the opening or space $a$ as that it cannot drop out unless the cutter B is out of the plate and the clamp forced into the space occupied by said cutter when in place.

$b$ is a diamond or other mineral or artificial hard point, set in the jaws or holder B'' B'', in such manner that it will project beyond the extreme ends of the jaws, and outside the line of width of the cutter B when used therewith, and so that such points will cut a channel or kerf wide enough to clear the saw, and avoid its contact with the sides of such channel or kerf. When the diamond or other point is used only to score the width of the kerf or channel, such points will conform to the shape seen in Fig. 8; but when it is desired to cut the whole width of the channel or kerf with the diamond-edge, then the shape of cutting-edge will be as seen in Fig. 9 or 10, and when so used the jaws B'' B'' will have to be so constructed that they will receive and securely hold such shaped diamonds or other points within their grasp.

E is a hand lever-wrench of steel made tapering on its two sides from a certain distance from the hand end to or near to a point at the other end, and is used for forcing the wedge D in either direction.

When the saw-plate A, with its clamp C, and wedge D, with the insertible cutters or diamond-holders, are in place, take the lever-wrench E and insert its pointed end in the opening $a$ back of the widest end of wedge D, then force the hand end of the lever over toward the wedge, one edge of the lever bearing against the end of opening $a$, the other against the wide end of the wedge will force the wedge forward, and the clamp C hard against the cutter, and that against the saw-plate back of the cutter, and if one movement of the lever-wrench is not enough to give the required pressure through the wedge upon the clamp, repeat the operation till it is forced sufficiently hard upon and against the cutter to hold it in its place as against any power that may bear on the cutter to force it back into space $g'$, between the plate and inner end of the cutter B, or holders B'' B''.

The angle at which the cutters are to be set, with relation to the stone to be sawed, must be determined by the texture and hardness of the stone, and, as a general rule, the angle at which a common stone-chisel is held, when struck by a hammer, so as most successfully to cut the stone, is the angle which the edge of the cutter in the saw should have to best cut or saw the same kind or texture of stone. The jaws or holders which contain the diamond or other points or cutter-edges will, however, stand much nearer at a right angle with the stone being cut or sawed than metal cutters.

The metal cutters B or B' are beveled to an edge, and equally from each side, so as to bring the cutting-edge $e$ exactly in the center of their width, and by the action of cutting away the stone the cutter becomes dull, or is thickened on its edge by the wearing away of the metal on its forward side, when the cutter is taken out and reversed, presenting the side that was forward and worn off to the back, and the sharp edge on the front, when it is again put in motion to cut the stone till the edge is worn or thickened on its forward side, when it is again reversed, which can be successfully done several times in the hardest granite before the cutter will need to be sharpened by heating and hammering on the anvil.

Some kinds of stone cut the best with cutting-tools that have the serrated edges $e'$, as seen in Fig. 6, and when that is the case, such cutters will be inserted in the place of cutter B, which has its edge straight and entire.

The cutters should always have the same temper that is put in the ordinary hand-chisel used by stone-cutters for cutting the same kind of stone, as it is a well-understood fact that the harder the stone to be cut, the harder must be the tool to cut it.

When the diamond or other hard points are used as described, and in connection with cutters B B', or with diamond cutting-edges $b'$, Fig. 9, or $b''$, Fig. 10, the channel or kerf cut by such arrangement of cutters in a stone by a saw is clearly shown in Fig. 12, where the path cut by the projecting or scoring points $b$ determines the width of kerf or channel, and the cutters B, with edges $e$, will cut and clear out the stone between the scores made by points $b$, precisely like a wood cross-cut saw does which has scoring and clearing teeth, as the scoring-points must always project outside of and beyond the line cut by the cutters B.

Some of the many advantages in this construction of saw and cutters are: The cutters are adjustable and reversible, as they can be reversed when the edge becomes dull or worn on one side, and thereby bring a sharp edge to operate to cut the stone. The cutters can be adjusted to any required projection from the edge of the saw-plate, with but little loss of time, and without much trouble, and such cutters can be worn up to within an inch of the end, and be securely held in their place. Also the jaws or holders for diamonds or other points or cutters can be adjusted to correspond with the clearing-cutters, and both kinds adjusted to the exact projection to have their cutting at the right distance from the center of the axis of the saw.

If, by any accident, a cutter or diamond-holder is broken at its point, it can be repaired and put back, and have the point made to have the same projection as if whole, although shorter in its whole length than others.

The saw-plate may be constructed in such way as that the clamp-piece C will be at and bear upon the back of the cutter B, as seen in Fig. 1, in dotted lines; but I prefer to clamp them on the throat side, and so as to bring the strain of the teeth in sawing against the solid metal of the saw-plate at the back of the tooth.

When the structure of the stone to be sawed is such as to admit of its being sawed with metal cutters alone, the saw is then made as seen in Fig. 4, having only metal cutters B or B' therein; or, when the stone is of a harder texture, the metal cutters B will be alternated with the jaws or holders B'' carrying diamond or other hard mineral or carbon points, as seen in Fig. 2; and, if the stone is still harder and more difficult to saw, then the cutters B will be taken out, and holders B'' inserted, with diamond or other hard points $b'$ or $b''$, as represented in Figs. 9 and 10, or the saw may, in some instances, when the nature of the stone will admit, be made up of all diamond or other hard points, and inserted in their holders, B'', as seen in Fig. 3.

These changes, however, depend upon the composition of the stone to be sawed, and the judgment and experience of the operator must determine which arrangement of cutting points or edges is best suited to cut or saw the stone to be sawed, as the invention is such that a saw made under it can be adapted to any structure or texture of stone, and successfully saw it.

This principle of saw, constructed as above described, for sawing stone, is also well adapted to purposes of channeling or grooving stone while in its natural bed, and greatly facilitate the quarrying of the stone and reducing it while in the quarry to or nearly to specific dimensions of blocks, as may be desired, and by so doing save a large percentage of the loss that is now sustained by the mode of drilling and breaking, as usually practiced in quarries, where the blocks have from necessity to be broken much larger in dimensions than is wanted when completely wrought and ready for use.

Having thus described my invention and its construction and uses, what I claim, and desire to secure by Letters Patent, is—

1. The reversible and adjustable cutter B, constructed in the manner and used in a circular-saw plate for sawing stone, as hereinabove described.

2. The reversible and adjustable cutter B', having serrated edge $e'$, when used in a circular-saw plate for sawing stone, as hereinabove described and shown.

3. The interchangeable and adjustable jaws or holders B'' B'', constructed in the manner and for the purpose herein described.

4. The clamp or throat-piece C, constructed as described, and wedge D, in combination with the cutters B B' and saw-plate A, in the manner herein described.

5. The combination of the adjustable interchangeable diamond-holders B'' B'' with the clamp-piece C, wedge D, and saw-plate A, as hereinabove described.

6. A circular saw for sawing stone, having the removable and adjustable cutters B or B' with chisel-edges, and made to be reversible and interchangeable with each other, and arranged in the manner as seen in Fig. 4.

7. A circular saw, A, for sawing stone, having the adjustable jaws or holders B'' B'' with diamond or other mineral points $b$ for cutters, when constructed and arranged as described and seen in Fig. 3.

8. A circular saw, A, for sawing stone, having the removable, reversible, and adjustable cutters B or B', alternated with the adjustable jaws or holders B'' B'' having diamond or other mineral points $b$, when arranged with relation to each other in the manner described and seen in Fig. 2.

JAMES E. EMERSON.

Witnesses:
EDM. F. BROWN,
CHARLES CHINN.